Oct. 7, 1969

J. S. CHRISTIANSEN 3,470,570

EXPANSIBLE DIVER'S WEIGHT BELT

Filed Feb. 3, 1967

INVENTOR.
JAMES S. CHRISTIANSEN
By Flam and Flam
ATTORNEYS.

Oct. 7, 1969　　　　J. S. CHRISTIANSEN　　　　3,470,570
EXPANSIBLE DIVER'S WEIGHT BELT
Filed Feb. 3, 1967　　　　　　　　　　　　　2 Sheets-Sheet 2
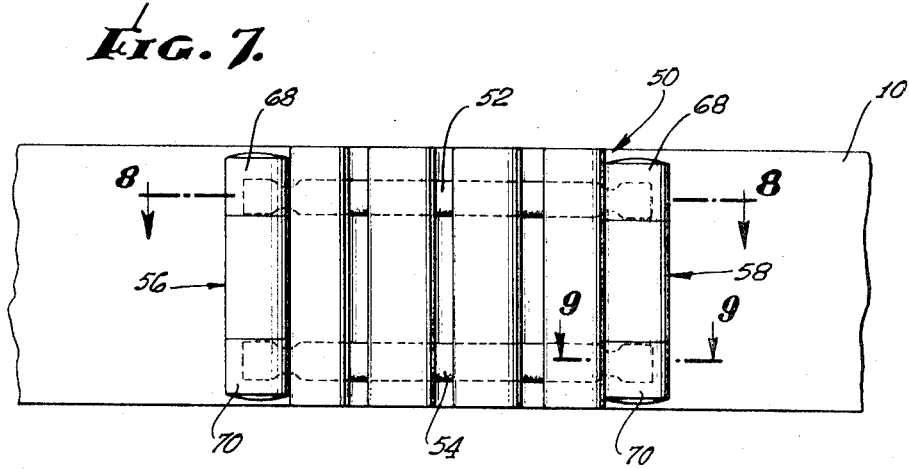
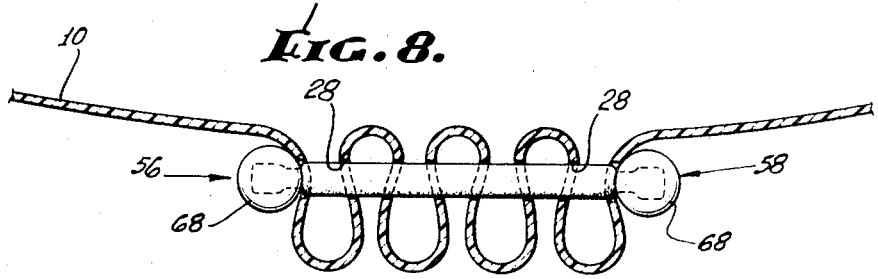
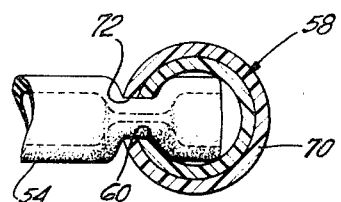
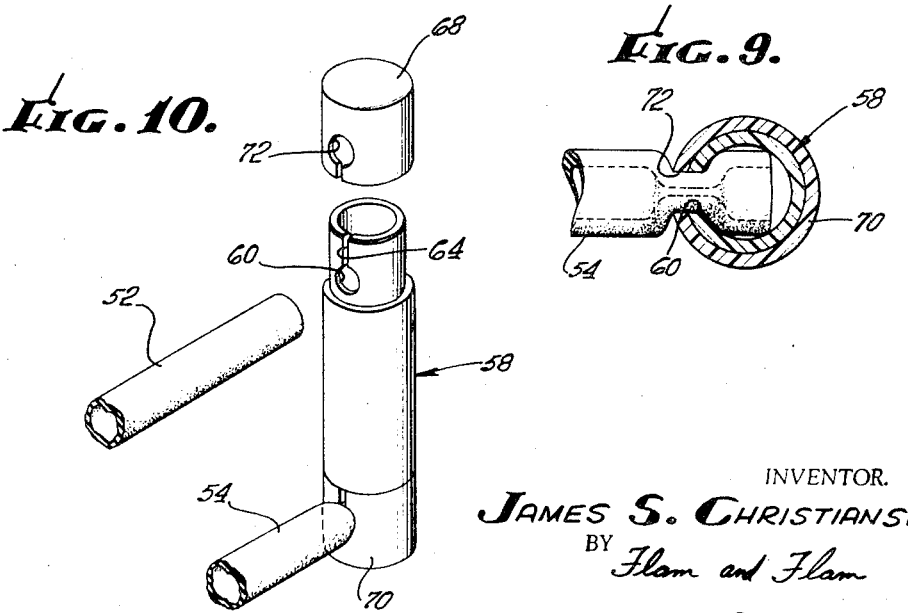
INVENTOR.
JAMES S. CHRISTIANSEN
BY Flam and Flam
ATTORNEYS.

United States Patent Office 3,470,570
Patented Oct. 7, 1969

3,470,570
EXPANSIBLE DIVER'S WEIGHT BELT
James S. Christiansen, Long Beach, Calif., assignor to Sports Industries, Inc., Gardena, Calif., a corporation of California
Filed Feb. 3, 1967, Ser. No. 613,885
Int. Cl. A41f 9/00
U.S. Cl. 2—338                    10 Claims

ABSTRACT OF THE DISCLOSURE

The diver's weight belt comprises a body-encircling member 10 made of tough durable belting material. An elastic element 16 has ends secured to spaced portions of the belt and threads through an accordion-folded portion of the belt whereby the belt adjusts to the degree of constriction of the diving suit and the diver's body.

BRIEF SUMMARY OF THE INVENTION

This invention is concerned with the problem of maintaining a weight belt in proper position on the body of the diver as he moves through regions of varying ambient pressure.

If a free diver descends a mere thirty-three feet, the air in his lungs reduces in volume by fifty percent, and his waist contracts. If he is in an inverted position, his weight belt loses tension and may slip under his arms, causing consequent annoyance and the necessity of readjustment.

A scuba diver may not suffer such volumetric contraction of his lungs. Yet the entrapped air in his foam rubber diving or exposure suit contracts to a degree dependent upon the depth of the dive. Accordingly, belt tension necessary to maintain proper engagement is lost and the belt may work loose.

It has been proposed to use belts made of surgical rubber or equivalent material that will provide substantial elongation and contraction without material change in tension. Such belts have not proved satisfactory from the standpoint of durability in that any slight nick in the rubber will grow under conditions of tension until rupture occurs. Preferably the belt is made of tough durable material, such as nylon belting; but such belts are not adequately elastic to compensate for changes in girth.

The primary object of this invention is to provide a durable diver's weight belt that has the desirable feature of elastic expansion and contraction in order to compensate for the effects of high ambient pressure upon the body and the exposure suit.

A companion object of this invention is to provide a diver's weight belt of this character that makes use of conventional nylon or similar inelastic belting material to retain the advantages of durability.

Another object of this invention is to provide a diver's weight belt of this character that is easily and economically manufactured.

Another object of this invention is to provide an elastic element having ends secured to spaced portions of the belt whereby the belt limits the strain that may be imposed on the elastic element, thus ensuring its long endurance.

Another object of this invention is to provide a belt of this character that is operative even if the elastic element ruptures.

Still another object of this invention is to provide a belt of this character in which the elastic element is easily replaced should it rupture.

This invention possesses many other advantages, and has other objects which may be made more clearly apparent from a consideration of several embodiments of the invention. For this purpose, there are shown a few forms in the drawings accompanying and forming a part of the present specification, and which drawings are true scale. These forms will now be described in detail, illustrating the general principles of the invention; but it is to be understood that this detailed description is not to be taken in a limiting sense, since the scope of this invention is best defined by the appended claims.

BRIEF DESCRIPTION OF THE DRAWINGS

FIG. 7 is a fragmentary elevational view similar to FIG. 2, but illustrating a modified form of the present invention.

FIG. 8 is a sectional view taken along a plane corresponding to line 8—8 of FIG. 7.

FIG. 9 is an enlarged fragmentary sectional view taken along a plane corresponding to line 9—9 of FIG. 7.

FIG. 10 is an exploded view illustrating a portion of the elastic member.

DETAILED DESCRIPTION

Figure 1:
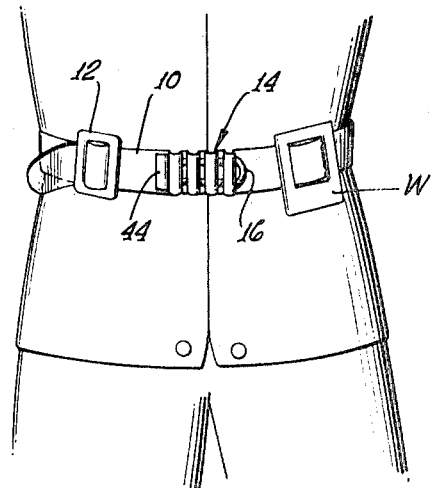
FIGURE 1 is a front elevational view of a diver's weight belt in place upon the body of the diver subjected to relatively high ambient pressure.
Figure 4:
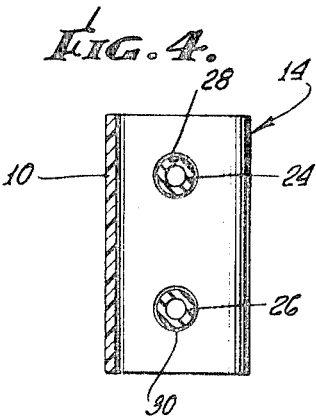
FIG. 4 is a transverse sectional view taken along a plane corresponding to line 4—4 of FIG. 2.
Figure 2:
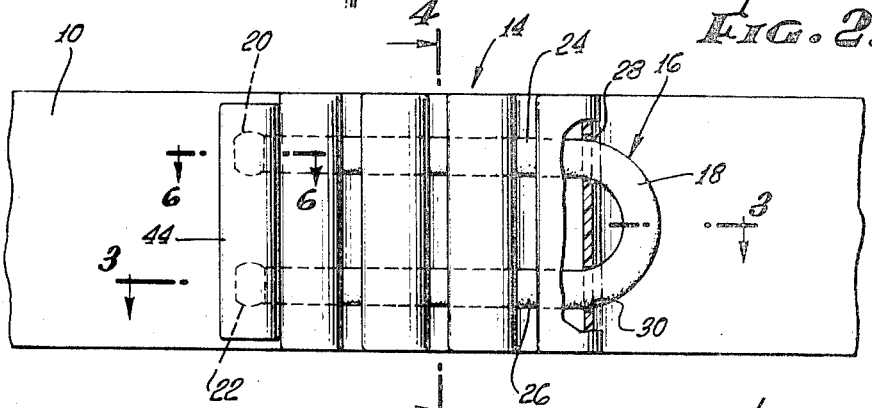
FIG. 2 is an enlarged elevational view of a fragmentary portion of the belt incorporating the longitudinally expansible and contractible portion, a portion of the belt being broken away and shown in section.

In FIG. 1, there is shown a diver's weight belt that includes a body-encircling member 10. The belt may be made of a wide variety of durable materials conventionally used for such purposes. For example, the belt may be made of relatively inelastic plastic materials exhibiting a high degree of toughness, such as nylon reinforced fabric, woven nylon or equivalent materials.

One end of the belt carries a conventional buckle 12 which, in a conventional manner, clamps the other end of the belt and secures the belt in place over a conventional exposure suit. Suitable detachable weights W are shown attached to the belt.

The belt has at least one integral intermediate section 14 paralleled by an elastic element 16 anchored at longitudinally spaced points of the belt.

The elastic element in this instance is a tube of surgical rubber or equivalent material capable of substantial elastic elongation but having a relatively low modulus of elasticity. The tube 16 in this instance is doubled on itself so that its medial portion 18 forms one operative end of the elastic element 16, and the two ends 20 and 22 of the tube form the other end of the elastic element 16.

The intermediate section of the belt paralleled by the elastic element is accordion folded so that it can be freely gathered and expanded in accordance with the state of the elastic element 16. The upper and lower legs or parts 24 and 26 of the tube 16 are threaded through two sets of longitudinally spaced apertures 28 and 30 cut in the belt section 14. These sets of apertures extend in spaced parallel relationship with respect to each other.

The span between successive apertures of the sets alternates from a larger distance to a smaller distance. The larger spans are on the outer side of the belt and the smaller spans are on the inner side of the belt. The smaller inner spans thus approximate a smooth continuation of the inner side of the belt and thus ensure minimum discomfort to the user. By locating the bulk of the folds on the outer side, the elastic element 16 is more effectively shielded thereby and thus protected from scraping or snagging on surrounding objects.

Figure 6:
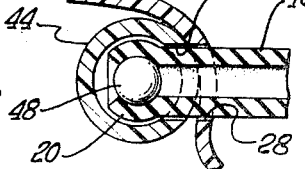
FIG. 6 is an enlarged fragmentary sectional view taken along a plane corresponding to line 6—6 of FIG. 2.

The tube ends 20 and 22, where they emerge from the end apertures, are connected together in any convenient manner. In the present instance, a relatively rigid tubular anchor or tie bar 44 is provided. The bar 44 is a relatively short tubular plastic sleeve having two longitudinally spaced lateral holes 46 (FIG. 6) for receiving the ends 20 and 22. The holes 46 are only slightly larger than the tube ends. Inserted in each end 20 and 22 is a plug in the form of a ball 48 that so enlarges the corresponding end as to prevent its withdrawal from the bar 44. The ends may be made accessible for insertion of the balls 48 by first threading the ends through the corresponding hole 46 and then laterally through the corresponding end opening of the anchor bar 44. The balls are then inserted and the ends are finally pulled back into the position shown. The tubular tie bar shields the plugs and thus ensures against their accidental dislodgment.

The anchor bar 44 and the medial portion 18 of the tube 16 are located on the outer side of the belt 10. The normal or unflexed length of the elastic element 16 is substantially less than the free length of the intermediate belt section. Accordingly, the elastic element draws the intermediate belt section into an accordion-folded orientation.

Figure 3:
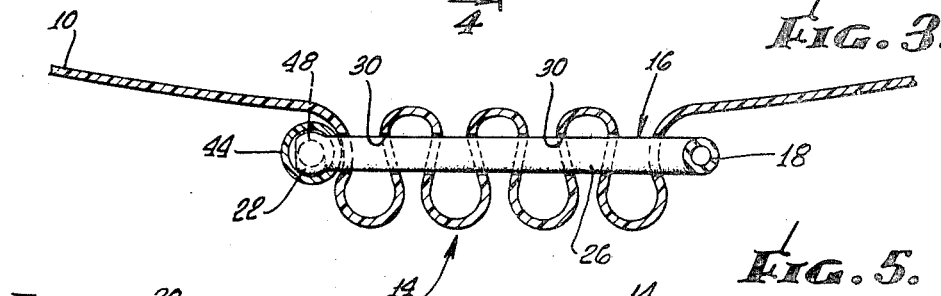
FIG. 3 is a sectional view taken along the offset plane indicated by line 3—3 of FIG. 2.

In FIG. 3, the elastic element 16 is unstressed and the folds of the accordion section are relatively close together. In the position illustrated in FIG. 5, the elastic section 16 is expanded and the folds of the accordion section are correspondingly separated.

Figure 5:
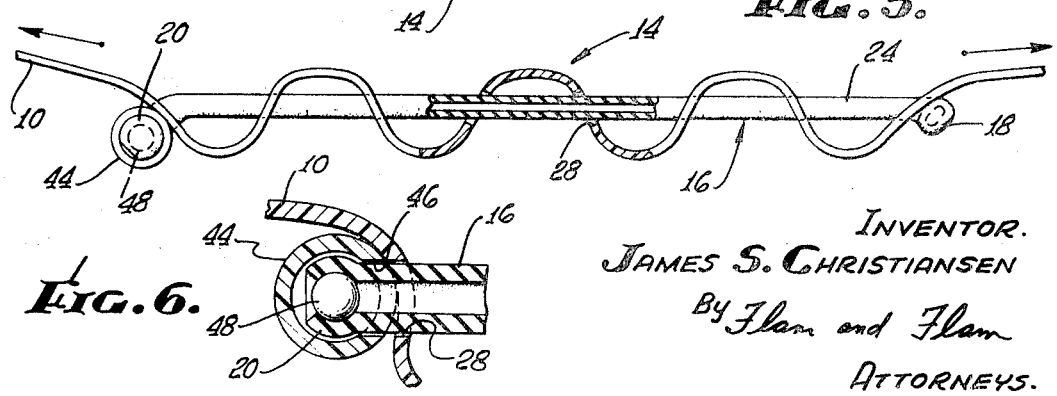
FIG. 5 is a fragmentary top plan view of the diver's weight belt shown in expanded position such as when the diver is subject to relatively low ambient pressure, a portion of the apparatus being broken away and shown in section.

In use, the diver places the belt 10 upon his body in such manner as to produce a substantial elongation of the elastic section 16 corresponding to FIG. 5. As the diver descends, the high ambient pressure compresses his body and exposure suit, but the elastic section 16 compensates for the change in circumference by contracting the belt at the intermediate belt section 14. By providing sufficient initial tension, the elastic section 16 will remain under stress during the course of the dive.

If desired, the holes 28 and 30 can be grommetted to prevent fraying. Should the elastic element 16 rupture for any reason, a section of surgical tubing provides a ready replacement. However, the element 16 is shielded by the outwardly projecting crests of the accordion-folded belt section 14, and thus will not normally be subjected to nicks or scrapes.

The belt itself limits the extent that the element 16 may be strained. Accordingly, the element 16 is protected from excess loading and premature rupture.

In the form of the invention illustrated in FIGS. 7 to 10, the belt 10 is provided, as before, with sets of apertures 28 and 30. The elastic member 50, in this instance, comprises two rubber or elastomeric sleeves 52 and 54 and two anchor bars 56 and 58. The sleeve 52 and 54 thread through the respective sets of apertures, and their ends are caught by the anchor bars. The anchor bars are identical, and a description of one will suffice as a description of the other.

The anchor bar 58, as shown in FIG. 10, is made of tubular plastic material having two spaced circular apertures (one of which is shown at 60) for the corresponding ends of the sleeves 52 and 54. The apertures are restricted so that the sleeves passed through them are constricted and thus clamped in place. In order to thread the sleeve ends through the apertures, access slits, as at 64, cut through the anchor bar from the apertures to the corresponding ends of the anchor bar. By simple manipulations, the sleeve ends are passed longitudinally through the slits until the sleeves enter and occupy the apertures.

Caps 68 and 70 are fitted over the ends of the anchor bar and provide a finished appearance. The ends of the anchor bar are reduced so that the caps are flush with the central portion of the bar 58. The caps have restricted apertures, as at 72, surrounding the sleeve ends to provide supplemental clamping thereof.

The inventor claims:

1. A diver's weight belt comprising a body encircling member made of tough durable belting material; said body encirling member having an integrally formed intermediate section; said intermediate section having two sets of substantially parallel holes spaced along the width of the belt; a tubular elastic element made of a single piece of highly stretchable material having ends respectively threaded through said sets of holes; a tie bar having lateral openings for receiving the ends of said elastic element; and plugs fitted into the ends of said elastic element and providing interference for preventing separation of said elastic element from said tie bar.

2. The diver's weight belt as set forth in claim 1 in which said tie bar is a tubular part shielding said plugs.

3. The diver's weight belt as set forth in claim 2 in which said lateral openings are circularly formed and located laterally of said tie bar; said tie bar having end openings substantially larger than said laterally located openings whereby said plugs may be inserted when threaded through said openings, said end openings allowing the said ends to be pulled back so that said plugs and said ends are located entirely within said tie bar.

4. A diver's weight belt comprising a body encircling member made of tough durable belting material; said body encircling member having an integrally formed intermediate section; said intermediate section having two sets of substantially parallel holes spaced along the width of the belt; a pair of elastic elements made of highly stretchable material and respectively threaded through said sets of holes; a pair of tie bars having lateral openings for receiving the ends of said elastic elements and at which said elements are clamped.

5. The combination as set for in claim 4 in which said lateral openings of said tie bars are restricted in order to constrict and clamp said elastic elements; said apertures having access slits extending to corresponding ends of the anchor bars.

6. The combination as set forth in claim 5 together with caps fitted over the ends of said tie bars, and having restricted apertures fitted about said elastic elements and clamping the same.

7. A diver's weight belt comprising a body encircling member made of tough durable belting material; said body encircling member having an integrally formed intermediate section; and an elastic element secured along said intermediate section; said elastic element having a normal length substantially less than the normal length of said intermediate section; said elastic element being threaded through holes formed in the said intermediate section for drawing said intermediate section into an accordion-folded configuration.

8. The diver's belt as set forth in claim 7 in which the span between successive holes alternates from a larger distance to a smaller distance with the larger spans on the outside of the belt whereby the smaller spans form approximate continuations of the inner side of the belt and whereby the elastic element is effectively shielded.

9. The diver's belt as set forth in claim 7 in which said belt is provided with two sets of substantially parallel holes spaced along the width of said belt, said elastic element including parts respectively threaded through said sets of holes with corresponding ends of said parts connected together.

10. The combination as set forth in claim 9 in which said parts of said elastic element are formed as ends of a single elastic member.

References Cited

UNITED STATES PATENTS

| | | | |
|---|---|---|---|
| 885,933 | 4/1908 | Lindy | 2—311 |
| 2,220,593 | 11/1940 | Watson | 2—300 X |

FOREIGN PATENTS 327,098  7/1935  Italy.

JORDAN FRANKLIN, Primary Examiner

GEORGE V. LARKIN, Assistant Examiner

U.S. Cl. X.R.

61—70; 128—327